(12) United States Patent
Marino (10) Patent No.: US 7,991,702 B2
(45) Date of Patent: Aug. 2, 2011

(54) WEB-BASED SYSTEM AND METHOD FOR COLLECTION AND MANAGEMENT OF REAL ESTATE OPEN HOUSE DATA

(76) Inventor: Anthony G. Marino, Newton, MA (US)

( * ) Notice: Subject to any disclaimer, the term of this patent is extended or adjusted under 35 U.S.C. 154(b) by 0 days.

(21) Appl. No.: 12/120,682

(22) Filed: May 15, 2008

(65) Prior Publication Data

US 2008/0281829 A1 Nov. 13, 2008

Related U.S. Application Data

(63) Continuation-in-part of application No. 11/800,643, filed on May 7, 2007.

(51) Int. Cl.
*G06Q 50/00* (2006.01)
(52) U.S. Cl. .......................... 705/313; 705/1.1
(58) Field of Classification Search ................ 705/1, 1.1, 705/313
See application file for complete search history.

(56) References Cited

U.S. PATENT DOCUMENTS

| | | | |
|---|---|---|---|
| 6,839,880 B1 | 1/2005 | Morse et al. | |
| 2001/0047282 A1 | 11/2001 | Raveis, Jr. | |
| 2002/0095346 A1 | 7/2002 | Liss | |
| 2002/0138485 A1 | 9/2002 | Faudman | |
| 2004/0077367 A1* | 4/2004 | Sama et al. | 455/518 |
| 2004/0078578 A1 | 4/2004 | Khandelwal et al. | |
| 2004/0164143 A1 | 8/2004 | Haley | |
| 2005/0086158 A1* | 4/2005 | Clare | 705/38 |
| 2005/0125408 A1 | 6/2005 | Somaroo et al. | |
| 2006/0020518 A1 | 1/2006 | Lovison et al. | |
| 2009/0030782 A1* | 1/2009 | Haworth et al. | 705/14 |

FOREIGN PATENT DOCUMENTS

WO WO01/60131 8/2001

\* cited by examiner

*Primary Examiner* — Naresh Vig
*Assistant Examiner* — Vern Cumarasegaran
(74) *Attorney, Agent, or Firm* — Sampson & Assoc., P.C.

(57) ABSTRACT

A system and method for management of real estate open house data includes a database and a website configured to provide access to information from the database. The website is configured to communicate with a user identification device, in the form of a user's cell phone or other mobile device, upon a user's entry into the open house, to transfer user identification data to the database.

32 Claims, 7 Drawing Sheets

302
Configure a database for storage of information relating to real estate open houses

304
Configure a web portal for access to information from said database

306
Configure portable data storage devices for distribution to users as user identification devices

308
Configure data collectors for collection of user identification data from user identification devices

310
Configure processing devices for transmittal of the collected user identification data from said data collectors to said database.

WEB-BASED SYSTEM AND METHOD FOR COLLECTION AND MANAGEMENT OF REAL ESTATE OPEN HOUSE DATA

RELATED APPLICATION

This application claims priority, and is a continuation-in-part of co-pending U.S. patent application Ser. No. 11/800,643, entitled Web-Based System and Method for Collection and Management of Real Estate Open House Data, filed on May 7, 2007, the contents of which are incorporated herein by reference in their entirety for all purposes.

BACKGROUND

1. Technical Field

The present invention relates generally to the field of real estate open houses. More specifically, the present invention is related to the automated collection and management of real estate open house data.

2. Background Information

Real estate open house attendance data is a valuable marketing tool for a real estate agent hosting an open house ("host agent"). Accurate contact information for open house guests allows the host agent to communicate with interested parties after the open house. For example, the host agent may want to inquire about levels of interest among the guests, and provide additional information about the property to the guest directly or through their broker/agent (if they are represented). Guests may want to request information through their agent, or from the host agent, and to have easy access to data relating to the open house.

The traditional open house process does not provide an efficient and reliable means for collecting open house attendance data. A host agent will typically ask open house guests to manually register themselves by signing a guest log. A host agent may then attempt to create a contact list by entering the handwritten names and contact information in a word processing device.

A disadvantage of this traditional sign in process is that it is time consuming and prone to errors. For example, the handwritten contact information may be illegible. Some contact information may be missing or inaccurate due to human error or by the deliberate misinformation or omission by the guests.

Another disadvantage of this sign in process is that it does not disclose to the host agent any agency relationship which may exist between an open house guest and their real estate agent. Problems may occur if this agency relationship is not recognized/made known. For example, a buyer's agent may be deprived of a potential commission, or the buyer may be subject to being diverted to another agent if a host agent is not put on notice that a open house attendee is already represented by a buyer's agent.

In addition, communication and collaboration among interested parties is hampered by the lack of a common repository of accessible data. Contact information for open house guests may be unavailable, or may be part of an agent's proprietary customer list. Open house attendance data collected by the host agent is not available to guests, property owners, or agents. Records of an agency relationship between a guest and an agent are not typically disclosed to the host agent. Open house property data, and ongoing listing status of a property previously attended is not directly accessible to real estate clients and open house attendees.

Therefore, a need exists for a system and method for collection and management of real estate open house data, which allows efficient and reliable communication and information exchange among parties to a real estate open house process.

SUMMARY

In one aspect of the present invention, a real estate open house data management system includes a database configured to store and dynamically update open house data, and user data, and a website configured to provide selective access to the database. A data collector associated with the website is configured to collect user data and open house data from a user identification device associated with a user attending the open house. A processing device communicably coupled with the data collector, is configured to transfer the user data and open house data from the data collector to the database.

In another aspect of this invention, a method of managing real estate open house data includes opening an account for the open house at a website, enabling communication between the website and a user identification device, the user identification device being a mobile device containing user identification data; collecting, with the website, the user identification data from the user identification device, and storing the data in a database; and configuring the account for access through the website.

In yet another aspect of the invention, a method of managing real estate open house data includes configuring a database for storage of information relating to real estate open houses; configuring a website for access to information from the database; and configuring data collectors for collection of user identification data from user identification devices on real estate open house premises.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

As used herein, the term "user" refers to persons or entities authorized to use aspects of the claimed invention. The term "agent" includes real estate brokers, agencies, and their employees. The term "client" refers to a person or entity with an agency relationship with a real estate agent. The term "host agent" refers to a real estate agent hosting an open house. The term "subscriber" includes a person or entity for whom or for which a subscription fee has been paid. The term "unaffiliated seller" refers to a person or entity, interested in transferring rights to real property, who has not engaged the services of a real estate agent. The term "unaffiliated buyer" refers to a person or entity, interested in acquiring rights to real property, who has not engaged the services of a real estate agent. The term "open house" refers to a temporary opening of a real property for public tour and inspection. It should be noted that the foregoing terms may be applied individually to separate entities, or in combination such as in the event a particular entity is serving in multiple capacities.

Briefly described, embodiments of the present invention include a system for automated collection and management of real estate open house data, including a database and a website configured for access to information from the database. In some embodiments, the database acts as a central repository of information accessible by various users, such as real estate agents and clients, host agents, subscribers, unaffiliated buyers, unaffiliated sellers, and members of the general public. For example, the database may store data relating to real properties for sale, open houses, and users of the system.

In some embodiments, various users may provide information for storage in the database. For example, individual subscribers may enroll in the system by providing personal information such as contact information. In another example, agents may provide information on clients and on real properties for sale, and host agents may provide information on open houses.

Collection of open house attendance data may be automated through electronic registration of open house attendees at data collectors on the open house premises. The data collectors are configured for collection of user identification data from user identification devices, which are portable data storage devices distributable to users of the system. Each user identification device is configured for storage of user identification data relating to the individual user to whom the device is to be distributed.

For example, a real estate agent may provide a client with a user identification device in the form of a card with a magnetic strip. The card contains user identification data relating to the client, such as the client's agency relationship with the agent. Upon attending an open house, the client may electronically register at the open house by swiping the card through a data collector, which in this example may be a card scanner. In other examples, user identification devices are distributable to other users such as agents and subscribers. Optionally, the data collector may be configured for manual entry of identification data for attendees without user identification devices.

The user identification data collected by the data collector is transmitted to the database through a processing device communicably coupled to the data collector. The processing device may optionally be configured for generation and storage of supplementary data, and for transmission of the supplementary data to the database. For example, processing devices of some embodiments may be configured for the generation of open house attendance data, such as statistics relating to the open house attendees. Also, processing devices of some embodiments may include user interfaces, such as keyboards and display screens. In some embodiments, the processing devices may be configured to connect to the web portal over the internet and to access information from a database.

Information in the database is accessible through the web portal. Optionally, the web portal may allow different levels of access to different classes of users. For example, a real estate agent may have access to open house activity of his or her clients, but would not have access to such data relating to clients of other agents. In some embodiments, the web portal may optionally be configured to provide information retrieval tools, communication tools, and Customer Relationship Management tools (CRM) for agents, as discussed in more detail below.

Some embodiments may be based on a subscription business model, in which the web portal may optionally be configured to provide access to information in the database to subscribers. Access through the web portal may be managed through user accounts. For example, a real estate agent may subscribe to the system, and create a free user account for a client, thereby authorizing the client to access the system through the web portal.

Figure 1:
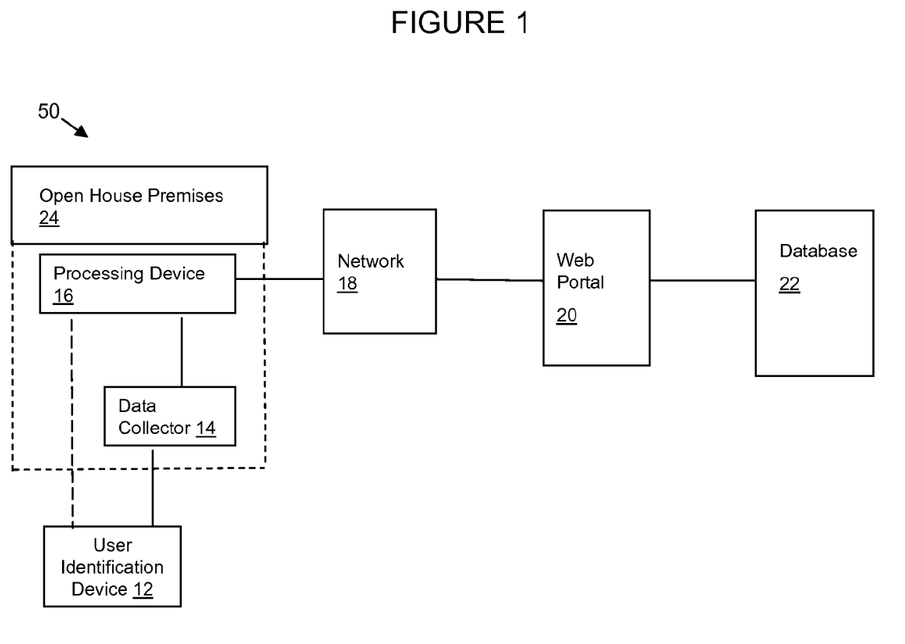
FIG. 1 is a schematic view of an embodiment of the present invention.

Turning now to the Figures, various embodiments of the present invention will be described in greater detail. As shown in FIG. 1, an embodiment of the present invention includes a user identification device 12. User identification device 12 is a portable data storage device, on which is stored user identification data relating to an individual user, and which is distributable to the user. User identification device 12 is configured for the electronic registration of a user at a real estate open house, at a data collector 14 located on the open house premises, for example at the front door of the open house.

The user identification device 12 may be any suitable device, such as a card with magnetic strip or other magnetic storage device, a flash memory storage device, a microprocessing device-based storage device, or a radio frequency identification storage device. In some embodiments, the user identification device 12 may optionally be configured to dynamically store additional data, such as data relating to the user's open house activity, described below in reference to the embodiment of FIGS. 3A, 3B.

Optionally, the user identification device 12 may be configured as a key for allowing entry to a real property. For example, it is customary to install a lockbox on a door of a real property for sale, which may be opened with a lockbox key, allowing entry to the property. In some embodiments, the user identification devices distributed to agents may be configured for use as electronic lockbox keys.

Data collector 14 is configured to collect the user identification data from the user identification device 12. Data collector 14 may be any suitable device, including a card scanner; an optical reader; a bar code scanner; a Universal Serial Bus port; or a keyboard. For example, the user identification device 12 may be a card with a magnetic strip, and the data collector 14 may be a card scanner configured for collection of the user identification data upon the user's swiping of the card 12 through it.

In the embodiment of FIG. 1, a system 50 includes processing device 16, which is communicably coupled to the data collector 14. Thus, as shown, processing device 16 may be configured for acquisition and storage of any data on device 12 through data collector 14, and for transmitting any such data over network 18 to database 22. In this embodiment, processing device 16 is configured to transmit the collected user identification data from the data collector 14 over a network 18, e.g. the internet, to database 22.

Processing device 16 may also be optionally configured for generation and storage of supplementary data, and for transmission of the supplementary data to the database 22. For example, processing device 16 may optionally be configured for generation, storage and transmittal of open house attendance data, such as the date and the location of the open house; and user attendance data, such as the time of the user's visit to the open house.

The processing device 16 may be any suitable device configured to store and transmit data, having an optional user interface, such as a desktop computer, a laptop computer, a personal digital assistant, or a cellular phone. Optionally, the data on the user identification device 12 may be updated upon communication with processing device 16 with data relating to the user's open house activity, e.g., with the user attendance data.

As discussed below, in some embodiments the network 18 may be the internet. In such embodiments, processing device 16 may be configured to access information from database 22 over the internet. For example, a host agent 34 (FIG. 2) may use a processing device 16 of these embodiments to connect over the internet to the web portal 20, and to log on to an account for the open house.

Web portal 20 is configured to provide access to information from the database 22, such as remote access over the internet. In some embodiments, the web portal may be configured to provide access on a subscription basis, such as in exchange for a monthly subscription fee, and may optionally require a password. For example, an agent paying a subscription fee ("subscribing agent") may provide a client 30 (FIG. 2) with a free client account, which may be accessed by the agent and the client. Also, as further described in relation to the embodiment of FIGS. 3A-3B, the web portal may optionally provide varying levels of access to data in the database, and also may provide optional tools for communication, information retrieval and downloading, and customer relationship management.

Figure 2:
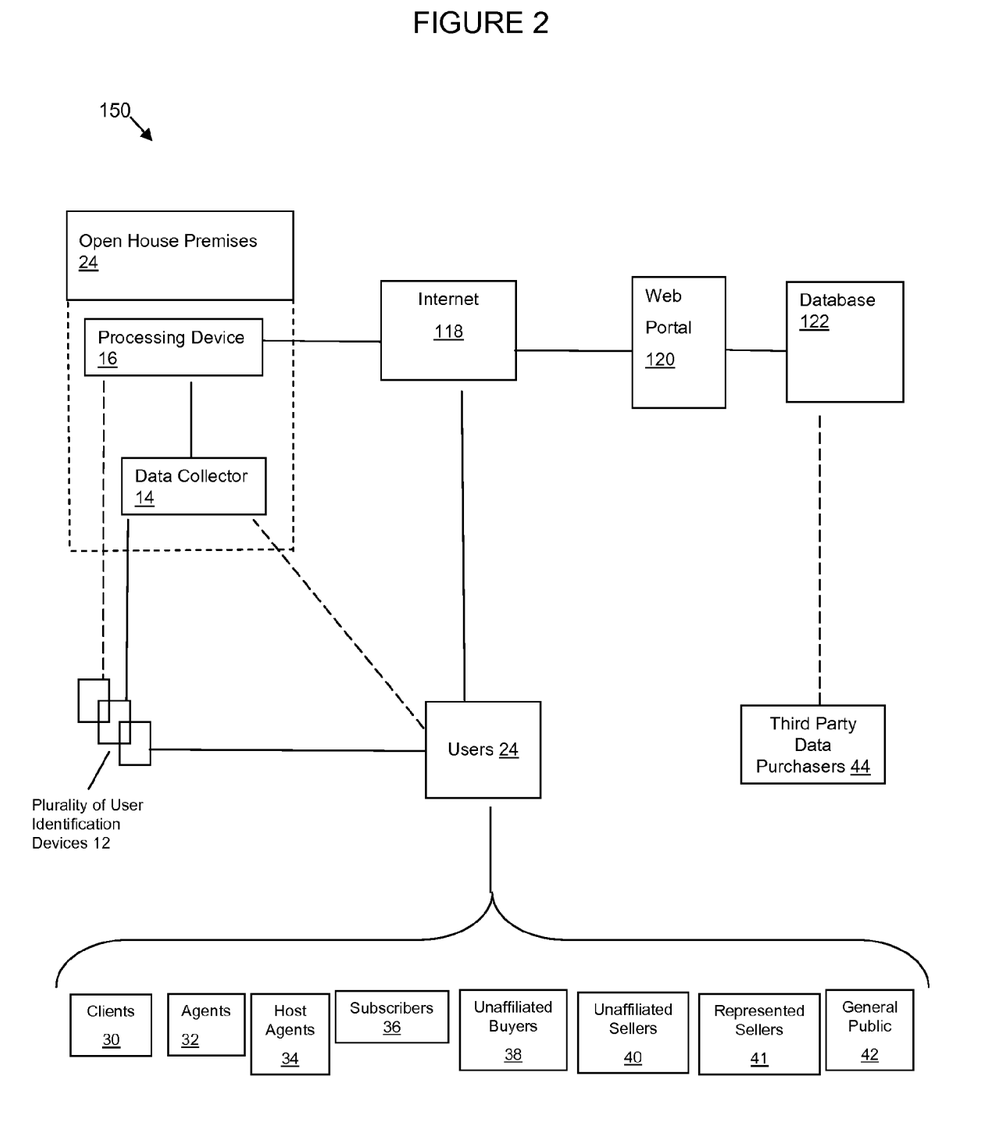
FIG. 2 is a schematic view, with optional aspects shown in phantom, of an alternate embodiment of the present invention.

Turning now to FIG. 2, an alternative embodiment is shown as system 150, which is substantially similar to system 50, but for the following distinctions. Web portal 120 may be configured to provide access to information from database 122 to authorized users 24. In some embodiments, users 24 may include clients 30, agents 32, and host agents 24. In embodiments based on an optional subscription model, users 24 may include subscribers 36, e.g., persons or entities paying subscription fees for access. Also, in some embodiments, web portal 120 may optionally be configured to provide access to information from database 122 to additional users 24, such as unaffiliated buyers 38, unaffiliated sellers 40, and members of the general public 42. In some embodiments, information from database 122 may optionally be made available to third party data purchasers 44, such as companies providing landscaping or other property-related services.

Web portal 120 may be optionally customized to provide various types and levels of access to different types of users 24. For example, web portal 120 may optionally be configured to allow a high level of access to database 122 for subscribing agents, and limited access for clients of subscribing agents. Also, web portal 120 may optionally be configured to include safeguards to ensure privacy of users of the system. For example, web portal 120 may be configured to omit personal identifying data from statistical information about open house attendees accessible by host agents 34. In another example, web portal 120 may optionally be configured to allow an individual user 24 to access information relating specifically to that user 24, and to restrict the user from access to information relating to other users.

In the embodiment of FIG. 2, database 122 may be configured to serve as a central repository of information collected from various sources. In some embodiments, collected information may originate from users 24 via the web portal 120. For example, a subscriber 36 may enroll on line via web portal 120, and provide user identification information through web portal 120, which may then be stored in database 122. Other optional examples of information which may be provided online via web portal 120 for storage in database 122 may include unaffiliated buyers 38, unaffiliated sellers 40, and members of the general public 42 providing personal identification information, in exchange for access to information and services; agents 32 and unaffiliated sellers 38 providing information on real properties for sale; host agents providing information on open houses; and agents 32 providing personal identification information from their clients 30.

Information stored in database 122 may also originate from user identification devices 12, collected via data collectors 14 at an open house, and transmitted by processing devices 16 over internet 118. As mentioned above, user identification devices 12 are distributable to users 24 for electronic registration at an open house via a data collector 14 on the open house premises. In various embodiments, user identification devices 12 are optionally distributable to users that include clients 30, agents 32, host agents 34, subscribers 36, unaffiliated buyers 38, unaffiliated sellers 40, represented sellers 41, and members of the general public 42. User identification data of clients 30 may optionally be stored on database 112 and user identification devices 12 via their agents 32, who may input the identification through web portal 120 for storage on user identification devices 12 and storage on database 122.

In some embodiments, data collector 14 may be optionally configured for the collection of data directly from users 24, in addition to or in lieu of collection of data from user interface devices 12. For example, the data collector 14 of some embodiments may optionally include user interface features, such as input keyboards and displays, configured for manual entry of identification for attendees without user identification devices 12. In such embodiments, users 24 may optionally provide their identification data directly through the data collector, for example, by providing identification data to a host agent 34 for entry into the data collector 14.

In another example, the data collector 14 of some embodiments may optionally include a biometric identification component configured for collection of biometric data from a user, such as a fingerprint recognition device, an eye recognition device, or a speech recognition device. In these embodiments, the processing device 16 may optionally be configured to correlate the collected biometric data with information from database 122. For example, the processing device 14 may be configured to identify a user by correlating the collected biometric data with the user's identification information accessed from the database 122 over internet 118.

Figure 3A:
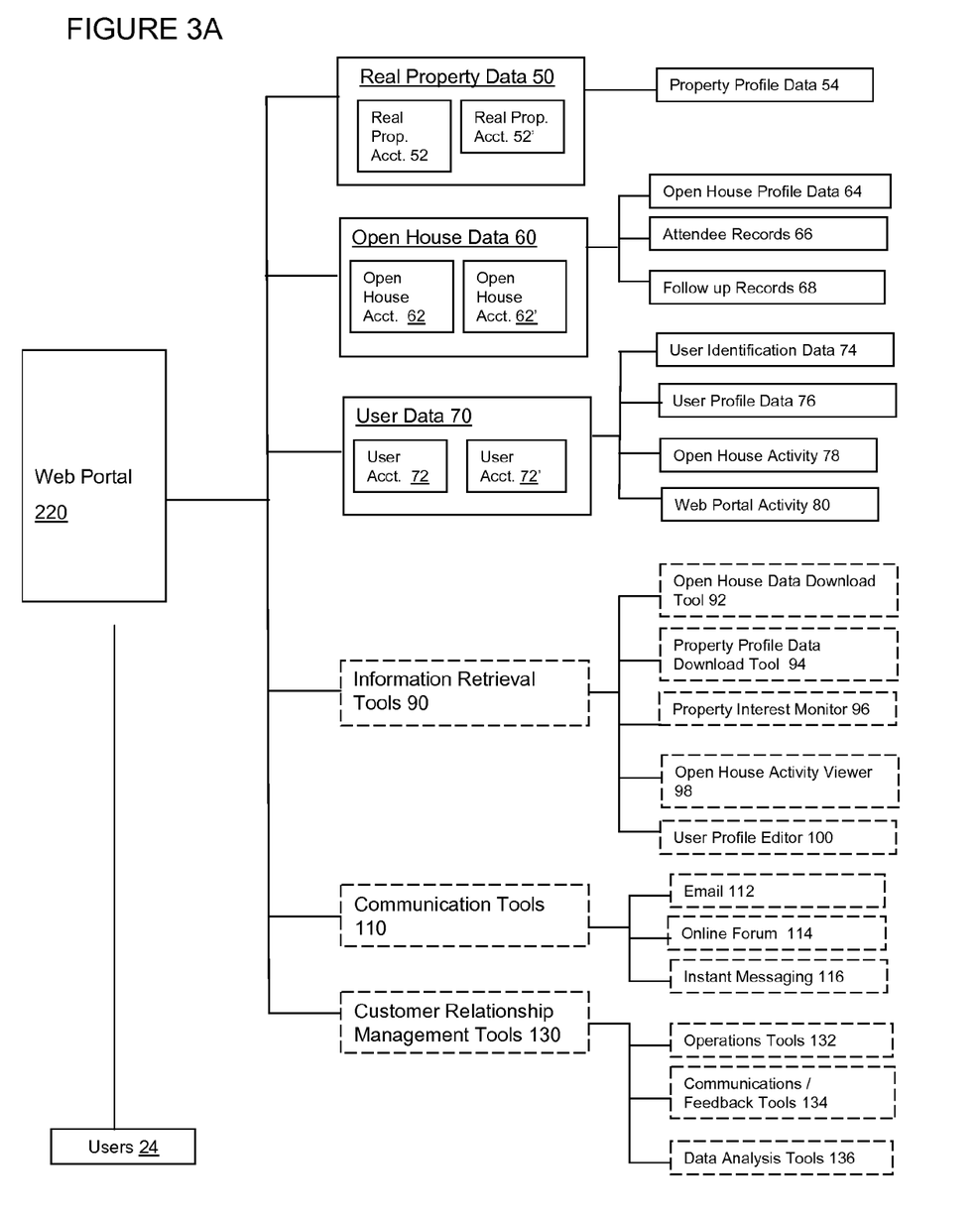
FIGS. 3A-3B are schematic views of additional optional features of the embodiment of FIG. 2.
Figure 3B:
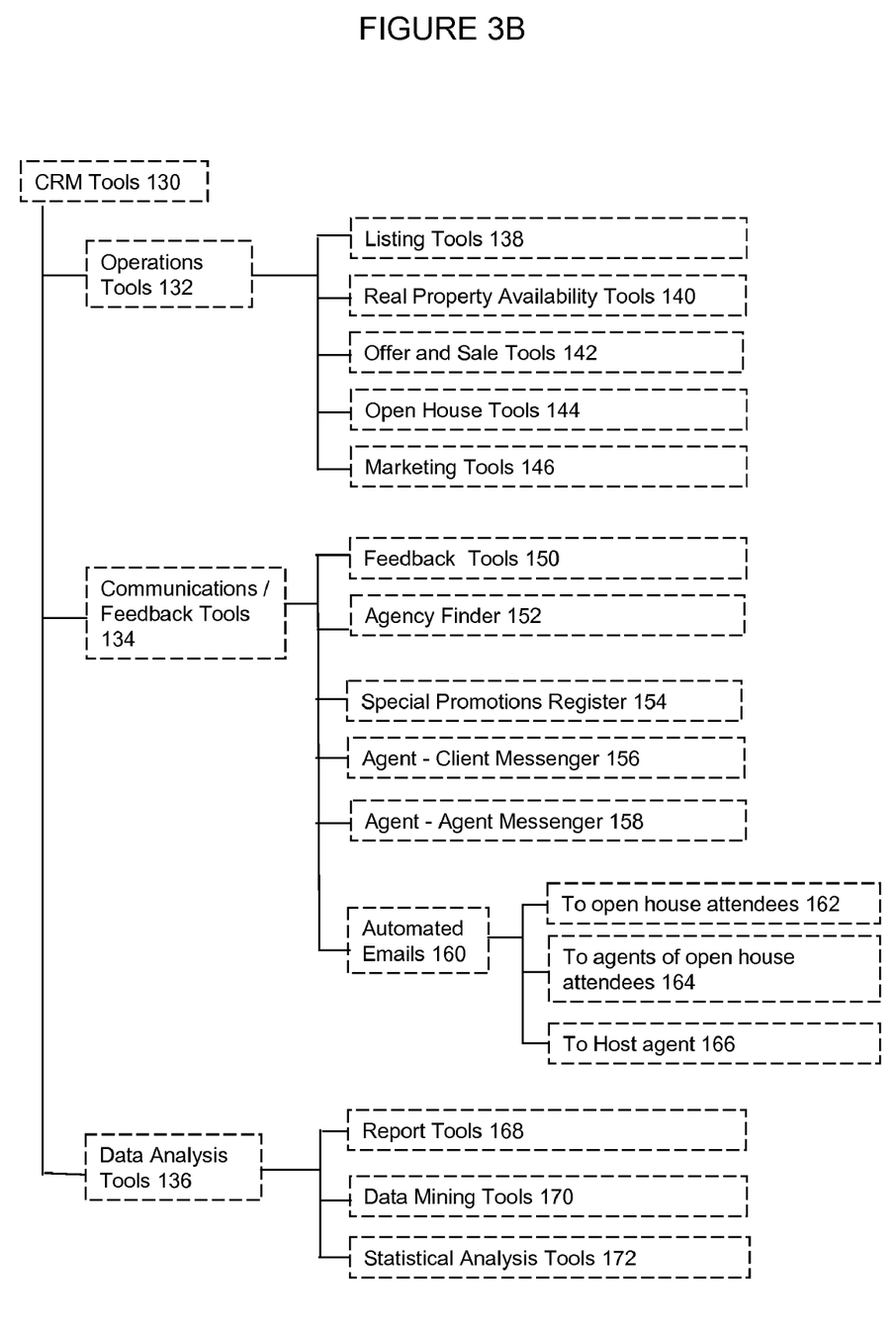

Turning now to the embodiment of FIGS. 3A and 3B, system 150 may optionally be equipped with a web portal 220 configured to provide varying levels of access to information and tools. For example, web portal 220 may optionally be configured to provide access to multiple types of data, such as Real Property Data 50, Open House Data 60, and User Data 70.

Real Property Accounts 52, 52', etc., may each be configured for access to Real Property Data 50 relating to an individual property for sale. Real Property Data 50 may include parameters of a property such as its size, number of bedrooms, and location.

Open House Accounts 62, 62', etc., may each be configured for access to Open House Data 60 relating to an individual open house. Open House Data 60 may include Open House Profile Data 64, with parameters of an open house such as the time, date, and host agent of an open house, and also may to include the Property Profile Data 54 of the property being offered for sale in connection with the open house. The Open House Profile data 60 may be configured to include updatable information such Attendee Records 66, with records of attendees at past or in progress open houses; and Follow Up Records 68, with records of follow up communications, e.g. between a host agent and open house attendees.

User Accounts 72, 72', etc., may each be configured for access to User Data 70 relating to individual users. User Data 70 may include the User Identification Data 74 of the user identification devices 12 (FIGS. 1, 2). The User Identification Data 74 of FIGS. 3A and 3B may be configured to include the name of the user 24, and status as a client 30, agent 32, host agent 34, subscriber 36, unaffiliated buyer 38, unaffiliated seller 40, represented seller 41, or member of the general public 42. If the user 24 is a client 30, then User Identification Data 74 may be configured to include identification data for the client's agent 32, such as the agent's name and contact information.

Also included may be User Profile Data 76, which may contain more confidential information, such as the user's contact information, family status, financial information, and real property preferences. Access to User Profile Data 76 may be restricted to the user, the user's agent if applicable, and to others as designated by the user.

User Data 70 may optionally be updated for each User Account 72, 72', etc. For example, a User Account 72, 72', etc., may be updated with the user's Open House Activity data 78, transmitted by processing devices 16 (FIGS. 1,2) from open house premises. Each User Account 72, 72', etc., may also be updated with Web Portal Activity data 80 with records of the user's history of interaction with the web portal 220, such as access to optional Information Retrieval Tools 90 and Communication Tools 110, as further described below.

It should be recognized that in addition to the various data generated by the embodiments hereof, embodiments of the invention may gather and display data from third parties, without departing from the scope of the present invention. For example, real property data 50, open house data 60, and user data 70, may include data gathered from independent third party sources such as various multiple listing services (MLS) or other internet real estate marketing services. These data may then be displayed via web portal 20, 120, 220, etc., along with data generated by the embodiments themselves.

Examples of optional tools which may be made available through web portal 220 are also shown in detail in the embodiment of FIGS. 3A-3B. The web portal 220 of this embodiment may provide Information Retrieval Tools 90, which may include tools for accessing and downloading data, such as Open House Data Download Tools 92 and Property Profile Data Download Tools 94. Information Retrieval Tools 90 may also include additional tools such as Property Interest Monitor 96, Open House Activity Viewer 98, and User Profile Editor 100. Property Interest Monitor 96 may be configured to provide reports on inquiries and offers regarding a property for sale. Access to Property Interest Monitor 96 may be restricted, for example to a host agent and a host agent's client, or to an unaffiliated seller. Open House Activity Viewer 98 may be configured for display of a user's open house activity 78. Access to Open House Activity Viewer 98 may be restricted to the user, and, where applicable, the user's agent. User Profile Editor 100 may be configured to allow the updating and correction of user profile data.

The web portal 220 of this embodiment may also provide Communication Tools 110 for electronic communication between authorized users, for example email 112, online forums 114 such as message boards, and instant messaging 116. Additional examples of applications of Communication Tools 220 are described below in relation to FIG. 3B.

The web portal 220 of this embodiment may also provide Customer Relationship Management (CRM) Tools 130, such as Operations Tools 132, Communications/Feedback Tools 134, and Data Analysis Tools 136. Exemplary applications of CRM Tools 130 are described in further detail in reference to the embodiment of FIG. 3B. Web portal 220 may optionally be configured to provide varying levels of access to CRM Tools 130 to different types of users, as discussed below.

Turning now to FIG. 3B, Operations Tools 132 of this embodiment may include tools for facilitating real estate processes. For example, Listing Tools 138 may be configured to allow a user to "list" a real property for sale, e.g., by setting up a real property account 52 and inputting real property data 50 into the account 52 (FIG. 3A). Real Property Availability Tools 140 may be configured to provide reports on available properties for sale with specified criteria. For example, an agent may use 140 to find desirable properties for a client.

Offer and Sales Tools 142 may be configured to facilitate the process of making an offer on a property, and closing a sale on the property. For example, agents may use tools 142 to negotiate a property. Open House Tools 144 may be configured to facilitate hosting of an open house. For example, a host agent may use 144 to open house account 62, and to input open house data 60 in account 62. Marketing Tools 146 may be configured for offering services to users. For example, an agent could use Marketing Tools 146 to advertise to prospective clients. Optionally, Marketing Tools 146 could be made available to real estate related businesses, such as moving companies.

Communication/Feedback Tools 134 may be customized for particular users and activities. For example, the Agent—Client Messenger 156 may be configured for private communications among agents and clients, such as for sending a map of an open house location to a client. Agent—Agent Messenger 158 may be configured for private communications among agents, for example to discuss a client's interest in a property.

Feedback Tools 150 may be configured to facilitate online evaluations, e.g., of real properties for sale. For example, Feedback Tools 150 may include online forms for the anonymous evaluation of an open house property which could be forwarded directly or indirectly to host agents, or represented sellers, etc. In other example, Feedback Tools 150 may include customer satisfaction survey forms distributable by a real estate agency to clients.

The Agency Finder 152 may be configured to facilitate the establishment of an agency relationship. For example, 152 may include a search engine for available agents for users, such as an unaffiliated seller 40 looking for an agent to list a real property for sale, or an unaffiliated buyer 38 looking for an agent to show him or her available properties for sale. Special Promotions Register 154 may allow users to register for special promotions such as discounts on services and/or products, which may provide valuable marketing information. For example, members of the public may provide contact information while registering, and may consent to be contacted regarding potential real estate opportunities and/or by promotions partners offering products or services that may be of interest.

Automated Message Generation 160 may be configured to automatically send messages (e.g., in nominally any form, such as emails, text messages, voice messages, or other alerts sent to a user's device, etc.) to and from users. For example, automated emails to an open house attendee 162, and his or her agent 164, if applicable, may confirm the attendee's open house visit. Automated emails 166 may alert a host agent (and/or a represented seller) that an attendee with certain characteristics has visited the open house.

The Data Analysis Tools 136 of this embodiment may be configured for analysis of various types of data stored in the database, such as the Real Property Data 50, Open House Data 60, and User Data 70. Report Tools 168 may be configured for generation of reports corresponding to certain parameters. For example, a host agent may use Report Tools 168 to obtain detailed reports on open house activity, such as statistics on attending guests. In another example, an individual user may use Report Tools 168 to obtain updated reports on all real properties he or she has visited.

Data Mining Tools 170 may be configured to search data for certain parameters, such types of web portal activity or public communications. Statistical Analysis Tools 172 may be configured for analysis of the stored data, for example to determine marketing trends.

Optionally, the web portal 220 of this embodiment may control the amount and nature of access for different classes of users. For example, web portal 220 may allow an individual user to access his or her own account, but restrict that individual from accessing other users' accounts. In another example, the web portal 220 may allow a user to access open house information such as listing sheets 54, time and date 58, and location 56, but restrict the user from accessing the list of attendees 64.

Figure 4:
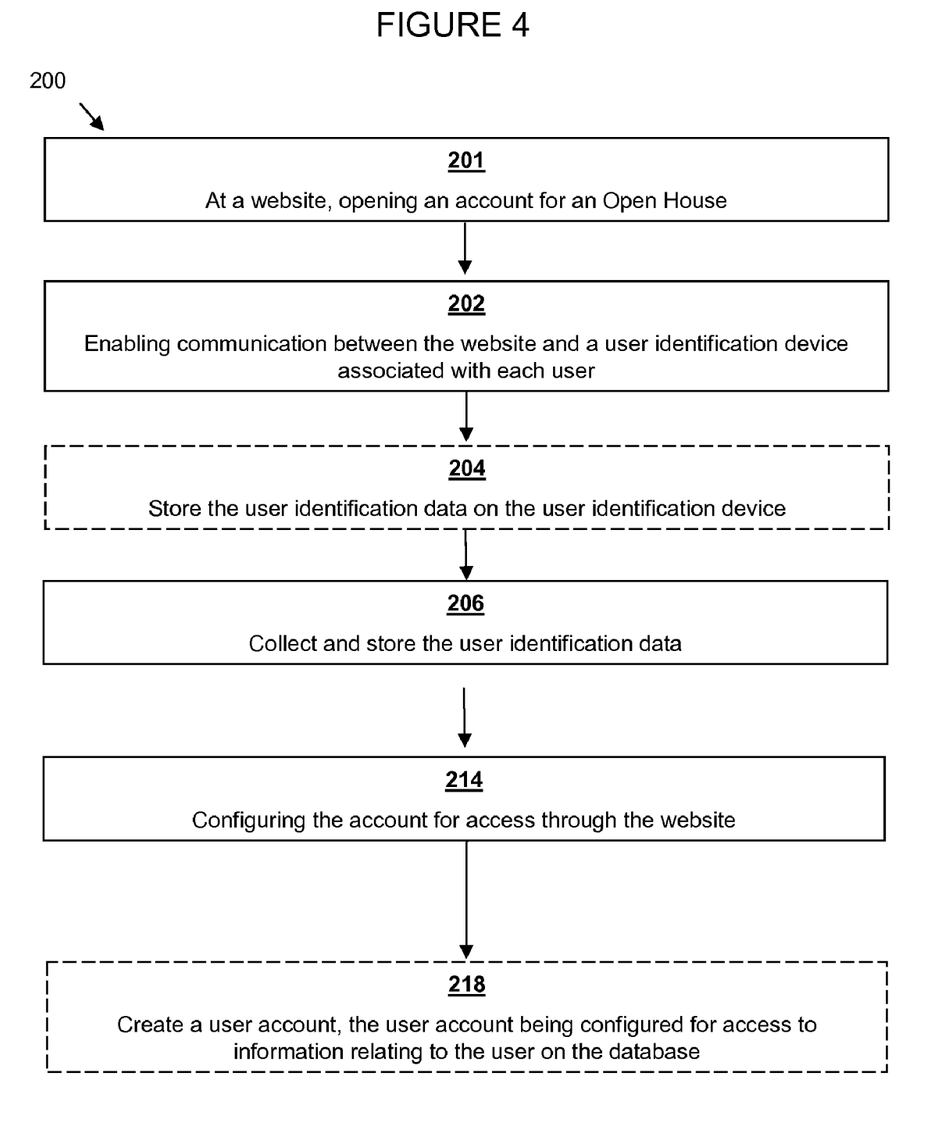
FIG. 4 is a flow chart of a method associated with embodiments of the present invention.

FIG. 4 illustrates an exemplary method of use 200 associated with embodiments of the present invention. At 201, website 20, 120 is used to register (e.g., open an account for) a planned open house. Communication is enabled 202, between the website and a user identification device containing user identification data (the data including a unique user identifier). For example, this communication may be enabled by a real estate agent enrolling a client in the systems of FIGS. 1-3B, and providing the client with the user identification card. In another example, user identification devices may be provided by a system administrator to various users. Alternatively, this communication is enabled by permitting communication between the website and a user's personal mobile device (e.g., cell phone, Internet-connected pocket computer or PDA which serves as the user identification device), as discussed below.

The user identification device may be pre-stored with user identification data. Alternatively, at optional Step 204, a user of the system may store the user identification data on the user identification device. For example, as part of an enrollment process, a client may provide his or her user identification data to an agent. The agent of this example may then store the user identification data on the user identification device at optional Step 204. Alternatively, the agent of this example may submit the user identification data to a system administrator, and the system administrator may provide the user identification device with the pre-stored user identification data to the agent for distribution to the client.

At Step 206, the user identification data from the user identification device is collected using a data collector, such as a card reader or other device, located on the premises of an open house. This data may then be transmitted, e.g., via a network 18 and/or the Internet 118, to web portal 20, 120. A data collector on the open house premises may be provided, for example by a system administrator or by a host agent. Alternatively, the data collector may take the form of provisions associated with the website 20, 120, to receive communications from the user's personal mobile device, as discussed below. In this instance, the user identification data may include the user's telephone number, email address, MAC address, or other identifier that is substantially unique to the particular user and/or mobile device.

At Step 214, information from the database 22, 122, may be accessed through web portal 20, 120. For example, a host agent may access information from the database relating to attendance at his or her open house. In another example, a client may access data relating to his or her own open house activity through the web portal.

Optional Step 218 involves creating a user account configured for access to information relating to the user on the database. For example, an agent may set up a user account for a client as part of an enrollment process. In another example, a system administrator may set up user accounts. In yet another example, a subscriber may set up his or her own account through a web portal.

Figure 5:
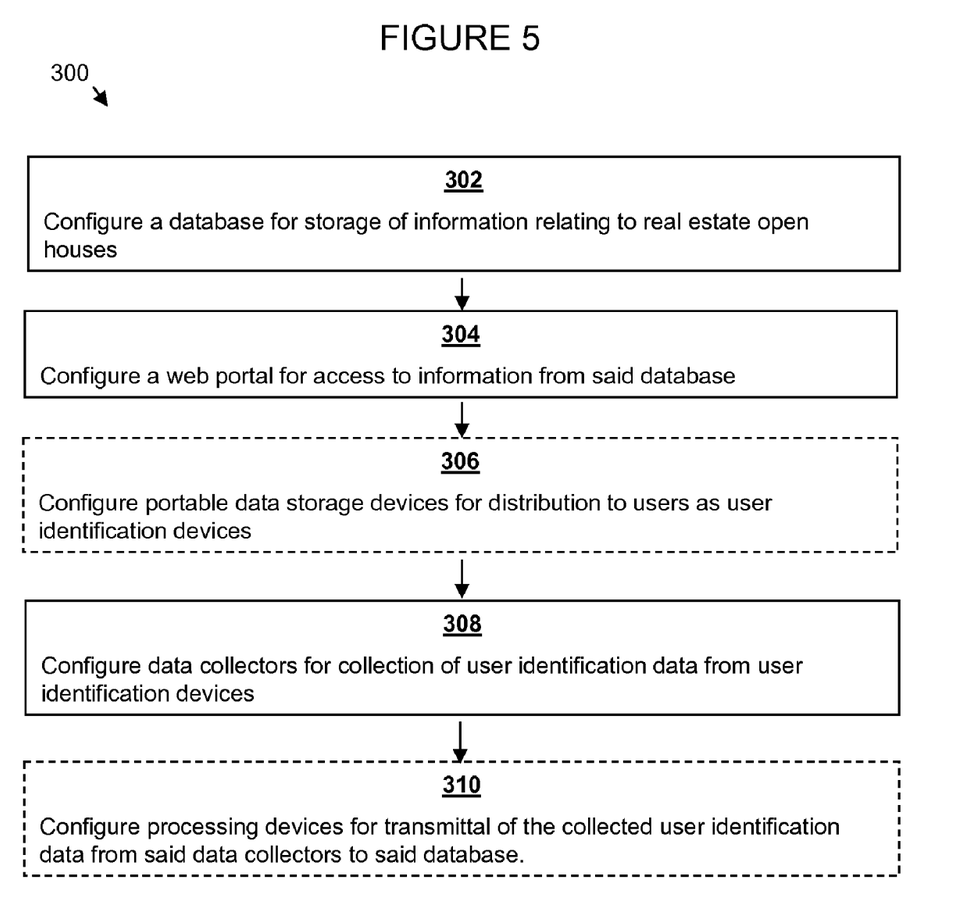
FIG. 5 is a flow chart of another method associated with embodiments of the present invention.

FIG. 5 illustrates another exemplary method of use 300 associated with embodiments of the present invention. At Step 302, database 22, 122, is configured for storage of information relating to real estate open houses. At Step 304, web portal 20, 120, is configured to provide access to information stored in the database. As discussed below, a user's personal mobile device, such as a cell phone, may serve as user identification devices 12. Optionally, at 306, portable data storage devices may be configured for distribution to users as user identification devices 12. For example, a system administrator may store user identification data on the user identification devices before making the devices available for distribution to users. In another example, a system administrator may store user identification data relating to a client on a user identification device, and provide the user identification device to the client's agent for distribution to the client.

At Step 308, data collectors 14 are configured for collection of user data (e.g., user identification data) from the user identification devices on real estate open house premises. As discussed above, the data collectors may be devices, such as card readers, etc., located at the open house premises. Alternatively, the data collectors may take the form of provisions associated with the website (web portal) 20, 120, for receiving communications directly from the user identification devices (e.g., from a cell phone or other personal mobile device as discussed below). Optionally, at Step 310, processing devices may be configured for transfer of the collected user data from the data collectors to the database.

Embodiments of the invention may implement method 300 in conjunction with method 200. For example, a system administrator may configure the database, web portal, user identification devices, data collectors, and processing devices at Steps 302-310 of method 300. Users such as agents, alone or in cooperation with the system administrator, may implement the various steps of method 200.

As mentioned above, in variations of any of the embodiments discussed above, a user's personal mobile device, such as a cellular telephone, PDA (personal digital assistant), pocket computer, notebook computer, or other Internet connected device, may serve as user identification devices 12. The personal mobile device may thus communicate with other elements of these embodiments using nominally any suitable protocol, including cellular, Wi-Fi, Bluetooth, NFC, and/or nominally any Internet-based protocols. When so used, the user's cellular telephone number, email address, static IP address, MAC address, etc., or surrogate therefor, serves to uniquely identify the user. This information, along with various data captured and/or volunteered by the user, may then be stored in database 22, 122, etc., and tagged to the unique identifier (e.g., telephone number, etc.) associated with the mobile device. It is contemplated that with the user's consent, user information resident on the mobile device may be transferred automatically to database 22, 122, etc., e.g., upon transmission of a text, email, or voice message (or other alerts) from the mobile device to web portal 20, 120, etc., and/or upon movement of the mobile device within range of a short range wireless communications access point. Such automatic transfer, however, is not required. Rather, the web portal may rely upon the user affirmatively providing such information, such as in response to various invitations and/or incentives, as discussed below. It is noted that in these variations, the data collector 14 and processing device 16 are both associated with the website 20, 120, and as such, may be disposed remotely from the open house premises 24.

As mentioned above, in addition to, or in lieu of, longer range wireless technology, relatively short range wireless technology, such as Bluetooth, Wi-Fi, NFC, etc., may be used to communicate with the users' personal mobile devices, via an access point deployed at the premises of the open house. This access point may include a conventional Wi-Fi (i.e., 802.11x) router, and/or Bluetooth/NFC access point (e.g., Wilico B200, B200A, or B200TS devices available from Futurlink of Barcelona, Spain; www.futurlink.com). This short range wireless communication may be used to search for any compatible mobile devices within range, and when found, transmit advertising or other information to those mobile devices e.g., to those entering or within an open house. For example, this short range communication may be used to broadcast an invitation to visit the website 20, 120, e.g., along with a link to the login page thereof, and/or announcements of other open houses in the area. It is also noted that two-way communication between the user and website portal 20, 120, may be effected via this access point.

Figure 6:
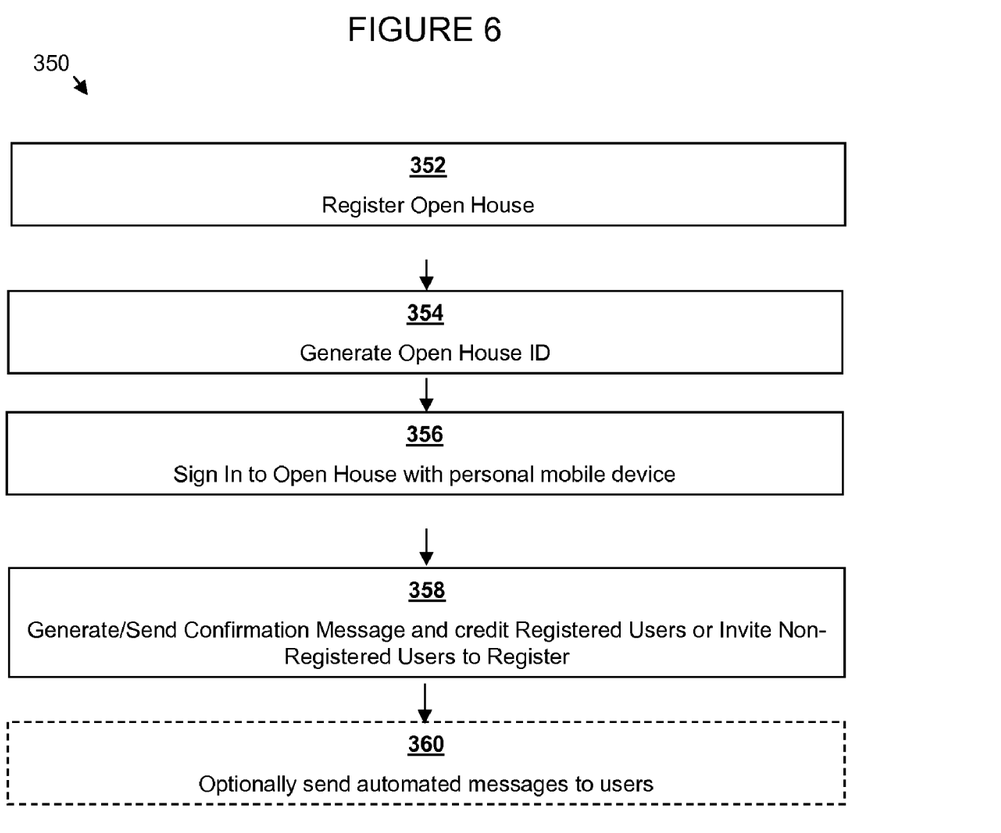
FIG. 6 is a flow chart of another method associated with embodiments of the present invention.

An exemplary method of operation 350 of this variation is described with reference to FIG. 6. As shown, a Host Agent 34 may initially register 352 a planned open house by logging onto web portal (e.g., website) 20, 120, 220, etc. The website may then respond by generating an open house account 62, 62', and sending the user a unique alphanumeric Open House ID for that particular open house. The Open House ID may be in nominally any desired format, such as HTML, PDF, etc., for ease of display on a computer or other smart device, and/or by printing.

The Host Agent 34 may then download and display this unique Open House ID at the open house, such as on a notebook computer placed inside the open house to form an in-house kiosk, on a printed page displayed within the open house, and/or on an advertisement transmitted via the short range access point discussed above.

Users attending the open house, including the aforementioned Clients 30, Subscribers 36, Unaffiliated Buyers 38, and General Public 42, may be instructed to register or "sign-in" 356 to that open house by sending a message (e.g., text, email, voice, or logging on, or sending other alerts) to the website 20, 120, and supplying with the unique Open House ID.

Upon receipt of the user's communication, the website 20, 120, may initiate several tasks. For example, it may generate and send 358 a confirmation to the user's mobile device. In the event the user is a Registered User 30, the website may credit the user's account with the open house visit, and then add this information to the user's stored account history (e.g., to user data 70, open house activity 78, etc.), and to open house data 60 for the particular open house. It is noted that as an added incentive to register, each open house visit may serve to generate "points" towards various rewards. Website 20, 120, may also send an invitation to the Registered User 30 to visit the site and complete a "feedback or comments" section to receive additional rewards "points".

In the event the user is unregistered (e.g., Unaffiliated Buyer 38, or a General Public 42 user), the confirmation may include an invitation to log onto the website and register, e.g., in order to take advantage of various benefits offered by the various embodiments of the invention, including open house tracking, rewards points, etc. Upon registration, the website 20, 120, may generate 218 a user account 72, 72', sending the user a unique username, user ID, etc.

Optionally, the website may also send 360 automated messages 160 (FIG. 3B) via email, text, voice, or other alerts, etc., sent to the various users (e.g., to their cell phones, computers, or other devices, (clients 30, subscribers 36, agents 32, etc.). For example, messages 162, 164, may be respectively sent to the open house attendees 30, and their agents 32, in the form of an alert that the user has attended the open house, along with the various information associated with the particular open house.

Messages 160 may also include a message 166 to the host agent 34, that may include anonymous and/or summary information relating to the open house activity, including the various open house attendees (e.g., clients 30, subscribers 36), along with contact information, etc., for the particular agents 32 representing the open house attendees. The emails 160 may further include messages 167 to represented sellers 41, including anonymous information from profiles 76 of attendees of the open house.

It should be understood that any of the features described with respect to any one of the embodiments described herein may be used with any other of the embodiments described herein without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A real estate open house agency relationship data management system, comprising:
   a database configured to store and dynamically update open house data including unique account information;
   said database further configured to store said open house data associated with a plurality of open houses including a unique identifier for each of the open houses and a unique identifier of a data collector used at each open house;
   said database further configured to store agent data for a plurality of pre-registered agents, wherein the agent data includes a unique agent identifier and contact information;
   said database further configured to store user data for a plurality of pre-registered users, wherein the user data comprises a unique user identifier, contact information, and identifying information of a real estate agent associated with said user;

an agency module communicably coupled to the database, the agency module configured to identify an agency relationship between any of the pre-registered users and a real estate agent they are associated with;

a website configured to provide selective access to the database;

a user identification device being a personal mobile device provided to the user by their associated real estate agent containing said unique user identifier and said unique agent identifier of the real estate agent associated with said user;

said data collector configured to collect said user identifier and said agent identifier from the user identification device when the user signs in at one of the plurality of registered open houses they are visiting with their user identification device;

a processing device communicably coupled with said data collector, said processing device configured to transfer said collected user identifier and agent identifier to said database;

the system further configured to create and maintain a record including said identifying information of the open house associated with the unique identifier of the data collector, said unique user identifier of the visiting user, and said unique agent identifier of the real estate agent they are associated with.

2. The system of claim 1, wherein said user data further comprises website activity data relating to the individual user's interaction with said website.

3. The system of claim 2, wherein the processing device is configured to process open house data that includes open house attendance data.

4. The system of claim 3, wherein the user identification device further comprises a mobile device selected from the group consisting of a cellular telephone, PDA, pocket computer, laptop computer, and combinations thereof.

5. The system of claim 4, wherein the mobile device is configured to include an identifier selected from the group consisting of the user's cellular telephone number, email address, static IP address, MAC address, surrogates therefor, and combinations thereof.

6. The system of claim 5, wherein the mobile device is configured to communicate wirelessly with the website, using cellular, Wi-Fi, Bluetooth, NFC, Internet-based protocols, or combinations thereof.

7. The system of claim 1, wherein the website is configured to generate an open house ID corresponding to the open house.

8. The system of claim 7, wherein the open house attendance information is generated in connection with receipt of the open house ID.

9. The system of claim 1, wherein the website is configured to record a credit for attendees of the open house who are registered users of the website, and to send a registration invitation to attendees who are unregistered users of the website.

10. The system of claim 9, wherein the credit is applied towards rewards for registered users.

11. The system of claim 9, wherein the website is configured to include with the invitation, a request for additional user data.

12. The system of claim 11, wherein the website is configured to request additional user data relating to an agency relationship between a real estate agent and the user, and user profile data.

13. The system of claim 12, further comprising a user account accessible through said website, said user account providing access to user data and open house data associated with a particular user.

14. The system of claim 1, comprising;
communication module associated website;
the communication module configured to provide anonymized data regarding the users attending the open house, to a host agent hosting the open house;
the communication module configured to enable direct communication between the host agent and any users attending the open house who do not have an agency agreement, while substantially preventing direct communication between the host agent and any users attending the open house who have an agency agreement; and
the communication module configured to enable direct communication between the host agent and the real estate agents of users attending the open house who have an agency agreement, while maintaining the anonymity of those users having an agency agreement.

15. The system of claim 14, wherein the communication module is configured to send one or more automated messages including alerts to real estate agents that the user has attended the open house, and summary open house activity data to a host agent of the open house and to represented sellers.

16. The system of claim 15 wherein the communication module is configured to send summary information that includes anonymous profile information of attendees of the open house.

17. The system of claim 16, further comprising a real property account module configured to provide access to data relating to an individual real property for sale stored on said database, through said website.

18. The system of claim 17, wherein the real property account module is configured to provide access to the open house data associated with the individual real property.

19. The system of claim 18, wherein the real property account module is configured to provide access to open house data including open house profile data identifying the location, time and date of the individual open house.

20. The system of claim 18, wherein the real property account module is configured to provide access to open house data including the anonymous profile information.

21. The system of claim 20, wherein the real property account module is configured to provide access to open house data including data on follow up communications with the attendees of the open house.

22. The system of claim 1, wherein the user is selected from the group consisting of: a client of a real estate agent, a real estate agent, a host agent hosting the open house, a seller of the open house property, a potential buyer without agency representation, a subscriber to information and services available through the website on a subscription basis, and combinations thereof.

23. The system of claim 22, wherein said website is configured to provide access to information from said database on a subscription basis.

24. The system of claim 1, wherein said website is configured to provide access to limited information from said database to the public.

25. The system of claim 1, further comprising information retrieval tools configured for retrieval of information from said database, said information retrieval tools being accessible through said website.

26. The system of claim 1, further comprising communication tools configured for facilitation of on-line communication among users, said communication tools being accessible through said website.

27. The system of claim 1, further comprising customer relationship management tools, said customer relationship management tools being accessible through said website.

28. The system of claim 1, wherein the data collector is configured to collect real estate listing and open house data from third party sources.

29. A method of managing real estate open house agency relationship data, comprising:
   opening an account for each of a plurality of registered open houses at a website;
   generating an Open House Identifier for each of the registered Open Houses;
   enabling communication between the website and a user identification device, the user identification device being a personal mobile device provided to the user by their associated real estate agent containing user identification data for pre-registered users in the form of a unique user identifier for the user associated with the device, and identifying information of the real estate agent said user is associated with;
   enabling said user to sign in at one of the plurality of registered open houses they are visiting with their user identification device;
   receiving the user identification data from the user identification device at the open house;
   storing the received user identification data and the Open House Identifier associated with the open house in a database accessible through the website;
   identifying agency relationships for the open house between users and the associated real estate agent;
   creating and maintaining a record of the identified agency relationship; and
   configuring the account for role-based selective access of the database through the website.

30. The method of claim 29, wherein said enabling further comprises generating an open house ID, and inviting users to sign into the open house account with the open house ID.

31. The method of claim 30, wherein said receiving further comprises collecting from the user identification device, a substantially unique identifier for the user.

32. The method of claim 31, wherein said receiving further comprises transmitting an invitation to the user to register on the website.

* * * * *